United States Patent [19]

Neagu

[11] Patent Number: 4,836,736
[45] Date of Patent: Jun. 6, 1989

[54] LEVEL RIDE LIFTGATE WITH RAMPING ACTION PLATFORM

[75] Inventor: Alexandru Neagu, Norwalk, Calif.

[73] Assignee: Maxon Industries, Inc., Huntington Park, Calif.

[21] Appl. No.: 59,808

[22] Filed: Jun. 9, 1987

[51] Int. Cl.$^4$ .............................................. B60P 1/26
[52] U.S. Cl. ................... 414/557; 187/9 R; 414/917; 414/558
[58] Field of Search ............... 414/557, 558, 556, 546, 414/539, 917, 545; 187/9 R

[56] References Cited

U.S. PATENT DOCUMENTS

| | | | |
|---|---|---|---|
| 2,725,152 | 11/1955 | Gwinn, Jr. | 414/557 |
| 2,774,494 | 12/1956 | Malmstrom | 414/546 |
| 2,979,214 | 4/1961 | Selzer | 414/557 |
| 3,269,567 | 8/1966 | Lugash | 414/546 |
| 3,369,678 | 2/1968 | Robinson | 414/558 |
| 3,528,574 | 9/1970 | Denner et al. | 414/558 |
| 4,002,106 | 1/1977 | Edmo | 92/129 X |
| 4,078,676 | 3/1978 | Mortenson | 414/917 X |
| 4,405,279 | 9/1983 | Davy et al. | 414/558 |

FOREIGN PATENT DOCUMENTS 144141 9/1982 Japan ................... 414/546

*Primary Examiner*—Frank E. Werner
*Attorney, Agent, or Firm*—Frederick E. Mueller

[57] ABSTRACT

A main frame pivotally supports the forward ends of a laterally spaced apart pair of parallelogram linkage systems. Each linkage system comprises an upper link and a two section lower link, rear ends of which are pivotally interconnected to a rear shackle, the lower end of which has a ground engageable roller. A load platform is pivotally connected along its forward edge to the rear ends of the upper links. The rear sections of the lower links are rigidly interconnected by a lift frame that is fitted at its opposite ends with upstanding crank members. A hydraulic piston cylinder mechanism is mounted adjacent each linkage system with its butt end pivotally connected to the main frame and the piston rod of each cylinder is pivotally connected to one of the upstanding crank members. The forward and rear sections of each lower link are pivotally interconnected by a knuckle pin and each lower link includes stops to bidirectionally limit relative angular displacement of the two sections. The geometry of the mechanism generates moments with respect to the knuckle pin in substantially all elevations of the linkage systems, other than contact of the shackle roller with ground, in the direction tending to align the pair of sections of each lower link. When the platform is lowered to be primarily supported by ground the resultant of the moments tends to misalign the pair of sections of each lower link to effect a ramping action of the platform.

25 Claims, 6 Drawing Sheets

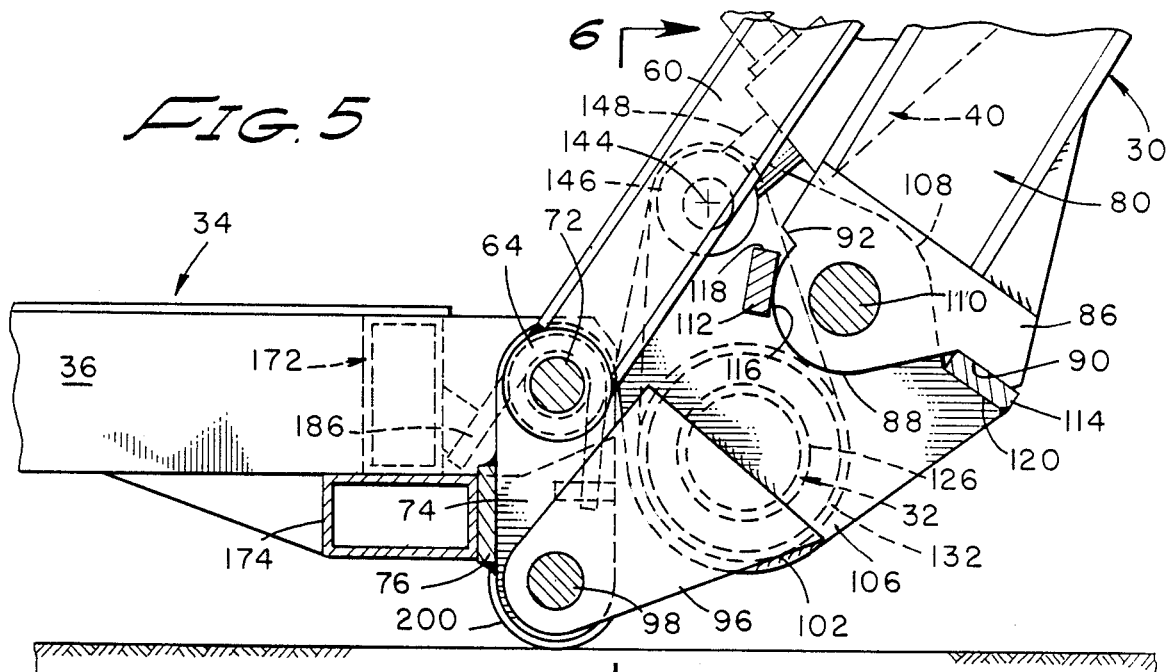
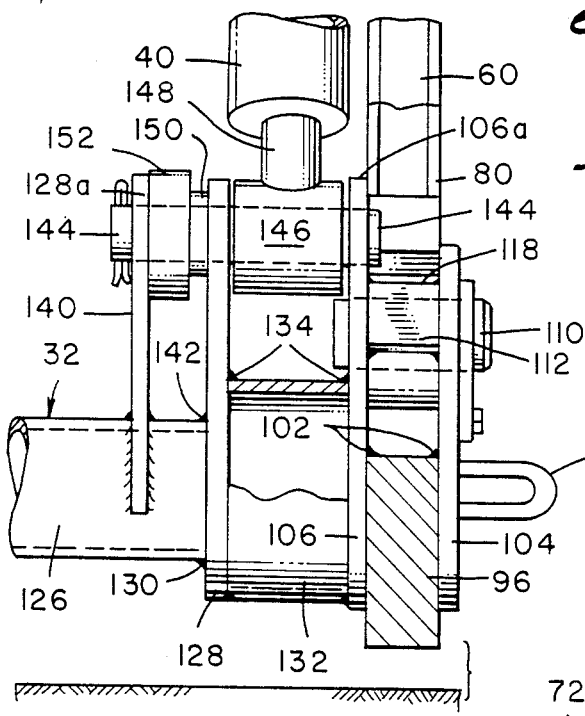
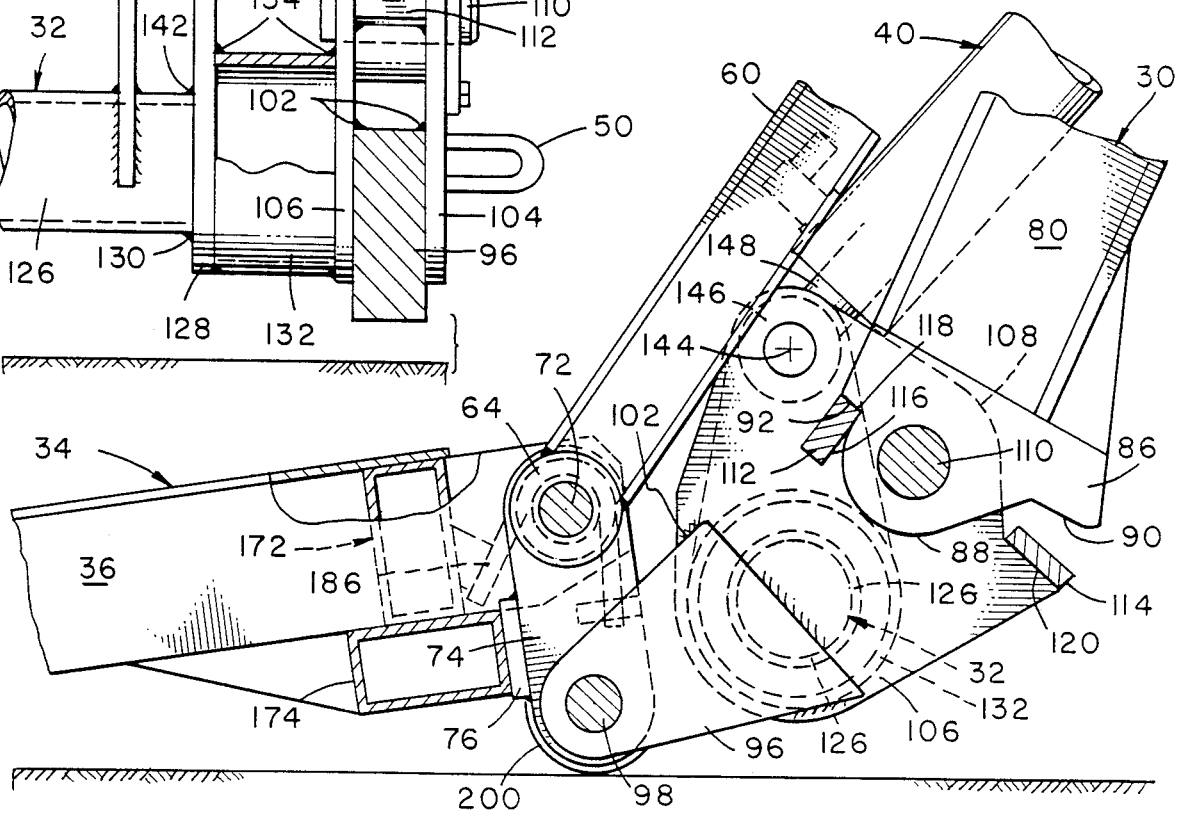

LEVEL RIDE LIFTGATE WITH RAMPING ACTION PLATFORM

BACKGROUND OF THE INVENTION

The present invention relates generally to load lifting and lowering devices and, more particularly, to a lift having a platform which remains substantially level during raising and lowering but which is automatically tiltable at ground level to define a ramp for easily wheeling a load onto and off of a planar top surface of the platform.

A common type of load elevator or lift comprises a substantially rectangular platform connected at one edge to the swingable ends of a laterally spaced apart pair of parallelogram linkage systems. The other ends of the linkage systems are pivotally connected to a support such as the chassis of a truck or a loading dock and a power means, usually hydraulic, is interconnected to the pair of linkage systems for moving the platform between ground level and that of the truck or dock. Each of the linkage systems comprises an upper arm which operates in tension and a lower arm, referred to as a lifting arm, which is subject to compression and is therefore relatively massive. The power means, typically one or two hydraulic cylinders, is drivingly interconnected to the pair of lower arms and is generally oriented to operate in parallel to the lower arms. The swingable rear ends of the linkage systems comprise a vertical link in the form of a shackle against which the weight of the platform and the load thereon are imposed.

As adapted for use on a truck these lifts may have the platform pivotally interconnected to the upper pivot pins of the rear shackles of the parallelogram linkage systems. In a so-called conventional liftgate the load platform may then also serve as a vertically standing tailgate to close the rear end of the truck bed during transit. In a fold under liftgate, the platform is usually of a two piece construction and both pieces are invertible with respect to the parallelogram linkage systems in order to be moved to an out of the way position beneath the bed of the vehicle during transit. In either case, the linkage systems may be adapted to give either a level ride, in which the platform remains substantially level during raising and lowering, or a ramping action in which the load platform gradually and slightly changes its inclination relative to a horizontal plane during raising and lowering. In both cases, as the platform is connected to the upper pivot points of the linkage systems, a short ramp section is included in the rear edge of the platform assembly to extend between ground level and the planar load bearing area of the platform to facilitate wheeling a load onto and off of the platform.

U.S. Pat. No. 4,002,106 discloses a conventional liftgate whose load platform remains substantially horizontal during raising and lowering and which at ground level is capable of tilting the platform to bring its rear edge into engagement with the ground thus providing a ramp. However, the device is relatively complex in that it employs two pairs of hydraulic cylinders, one of which provides the power to raise and lower the platform. The other relatively complex pair of cylinders provides the power for a tilting action of the platform.

It is also known in the prior art to devise a fold under liftgate having a platform which remains substantially horizontal during raising and lowering and which at ground level operates to tilt the platform to bring its rear edge into contact with the ground. In this device each of the parallogram linkage systems has a lower or compression arm which is made up of two pivotally interconnected knuckle joint sections and is interconnected within the linkage such that the extreme opposite ends of the two interconnected sections are foreshortenable to induce the tilting action of the platform. This device has not proved satisfactory in use in that the knuckle joints have been known to inadvertently open up to induce an undesired tilting of the platform during raising and lowering.

SUMMARY OF THE INVENTION

The present invention avoids the above and other disadvantages of the prior art. The device includes a mainframe mountable, for example, at the rear end of a truck. Opposite ends of the mainframe include a pair of shackle means for supporting the forward ends of a pair of parallelogram linkage systems for the opposite sides of the platform. Each of the linkage systems comprises an upper link in superposition above a two-part lower link, the rear ends of the linked pair being pivotally interconnected to a normally vertically disposed rear shackle link. A lift frame extends transversely between the rear parts of the lower links of the pair of linkage systems which are pivotally interconnected to the lower pivot point of the pair of rear shackles coaxially with the pivot axis of the lower links of the linkage system. Adjacent each of its opposite ends the lift frame integrally mounts a crank member which also comprises an integral part of the rear part of the lower link of the corresponding linkage system. Inwardly adjacent to each linkage system a double acting hydraulic cylinder has its piston rod pivotally interconnected at a rear end to the corresponding crank and has its forward end pivotally interconnected to the main frame. Each hydraulic cylinder has its axis oriented such that it extends in approximately diagonal relationship to the corresponding parallelogram linkage.

The main frame mounts a hydraulic power source for actuating the pair of hydraulic cylinders that is interconnected to the cylinders in a circuit such that the full area of the rodless side of the piston of each cylinder is subjected to hydraulic pressure in order to raise the lift frame by extension of the piston rod. Conversely, when the hydraulic circuit is valved to bleed pressure from the rodless side of the piston gravity effects lowering of the lift frame. Alternatively, the fluid pressure may be imposed on the rod side of the piston to effect power lowering of the lift frame and platforms.

The load platform may take the form of a two piece assembly comprising a main platform section and a flip over section pivotally connected to the rear edge of the main section to be invertible thereover. The flip over section tapers rearwardly to a thin relatively knifelike edge such that when the two platform sections are in coplanar load bearing position and tilted downwardly rearwardly by corresponding tilting movement of the rear shackles the rear edge of the platform assembly comes into contact with the ground. On the underside of its forward edge the main platform section has a stop means to abut the rear faces of the rear shackles when the platform is in the extended load bearing position. Each of the rear shackles at its lower end is fitted with a ground engaging roller mounted coaxially with the lower pivot points of the linkage systems to facilitate tilting of the corresponding shackle slightly out of a vertical position when the lower arm of the corresponding linkage system is foreshortened or opened.

BRIEF DESCRIPTION OF THE DRAWINGS

FIG. 5 is a sectional view on the line 5—5 of FIG. 4.

FIG. 6 is a sectional view on the line 6—6 of FIG. 6.

FIG. 7 is a sectional view like FIG. 5—5 but with the parts shown in the ramped condition.

DESCRIPTION OF THE PREFERRED EMBODIMENT

Figure 1:
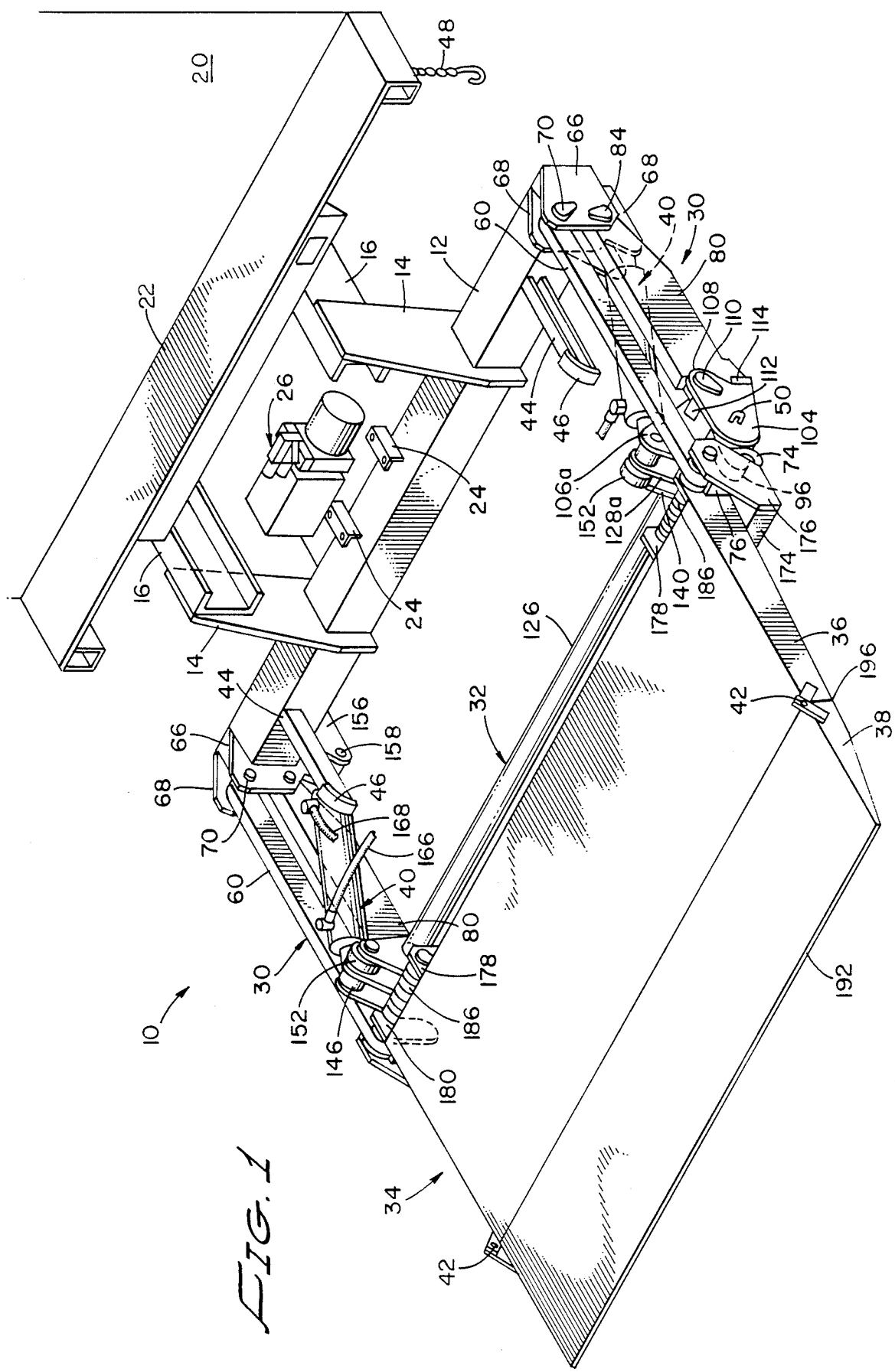
FIG. 1 is a perspective view of a presently preferred embodiment of the invention attached to the rear end of a truck, the platform and parallelogram linkage systems being depicted in a substantially horizontally extending position substantially midway between ground level and the bed of the truck.

In FIG. 1 the invention is schematically depicted as embodied in a fold under type of liftgate, designated generally by the numeral 10. In this case the device includes a mainframe 12, which may take the form of a box beam made up of steel plates, that is centrally fitted with an upstanding laterally spaced apart pair of gussets 14 by means of which the liftgate 10 may be affixed, as by welding, to chassis frame members 16 of a truck 20. As is usual in the case of a fold under liftgate, the rear end of the truck is fitted with an extension plate 22 flush with the bed of the truck. The upper surface of the main frame 12 may be fitted with a pair of brackets 24 for mounting a conventional electro-hydraulic power system 26.

Figure 8:
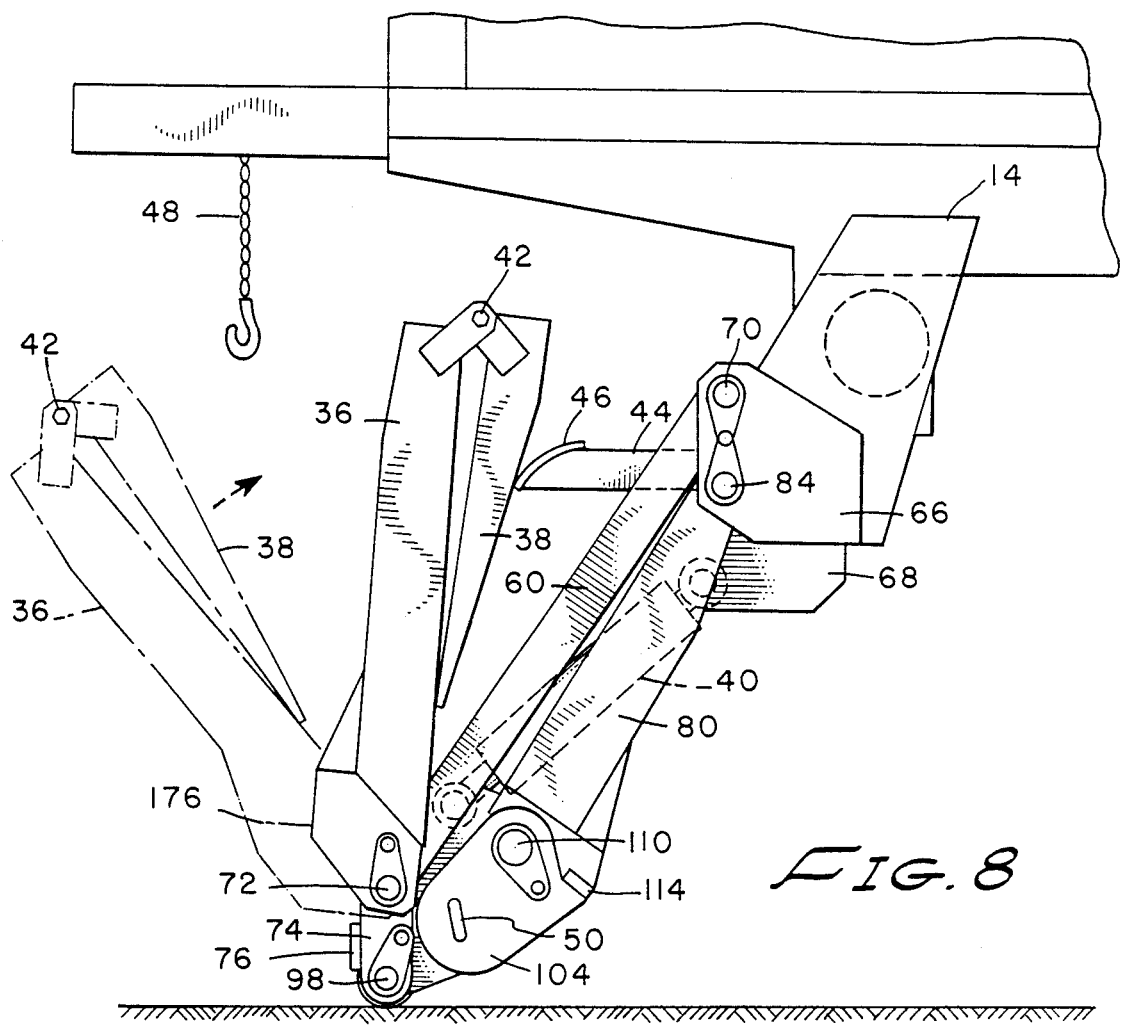
FIG. 8 is a side elevational view similar to FIG. 2 but showing the platform in a partially folded condition.
Figure 9:
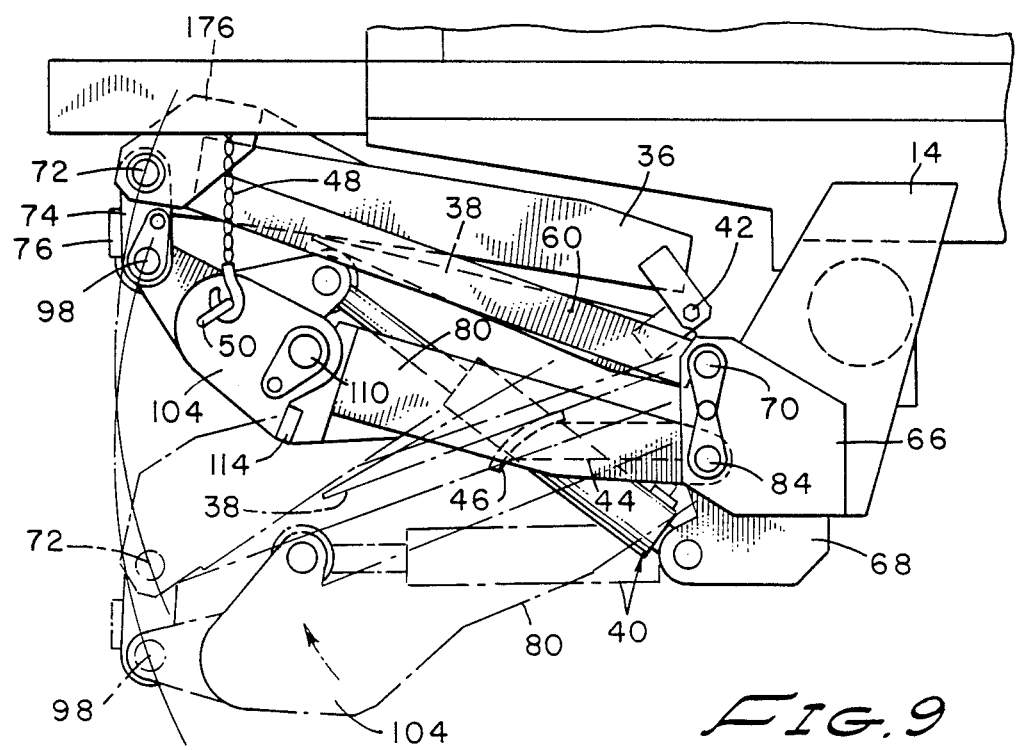
FIG. 9 in a view similar to FIG. 8 but showing the parts of the device in different relative positions when the platform is raised to a stowed transit position under the bed of the truck.

In general, in addition to the main frame 12 the liftgate 10 comprises a pair of parallelogram linkage systems 30, a liftframe 32, and a foldable platform 34 comprising a main platform section 36 and flip over extension 38. A bidirectionally acting power cylinder 40 is disposed adjacent each linkage system 30 and drivingly interconnected between mainframe 12 and lift frame 32 to effect raising and lowering of the platform 34 between the bed height of the vehicle and ground level. As is well understood in the art and, as illustrated in FIG. 9, when the liftgate 10 is not in use for loading or unloading of the vehicle 20 it occupies a transit position in which it is folded under the rear end of the bed of the vehicle. For that purpose, the main platform section 36 is interconnected to the flip over section 38 by hinge means 42 so that the flip over may be inverted over the main platform section which is then turned to the position of FIG. 8. The folded platform sections are moved into stowed away position beneath the bed of the vehicle when the cylinders 40 are energized in a mode to raise the linkages. In that connection, the rear face of the mainframe 12 is fitted with a laterally spaced apart pair of rearwardly projecting members 44 having platform engaging rear end cam faces 46 for coaction with the platform sections during movement of the platform sections into and out of folded transit position. A safety chain hook 48 mounted at one end of the extension plate 22 is engageable with an eye 50 mounted at one end of the lift frame assembly 32 when liftgate 10 is in the transit position.

More particularly, and referring to FIGS. 2 through 7, except as noted the invention will be described in further detail with reference to one side only of the lift 10 in view of its symmetry about its longitudinal midline.

Figure 2:
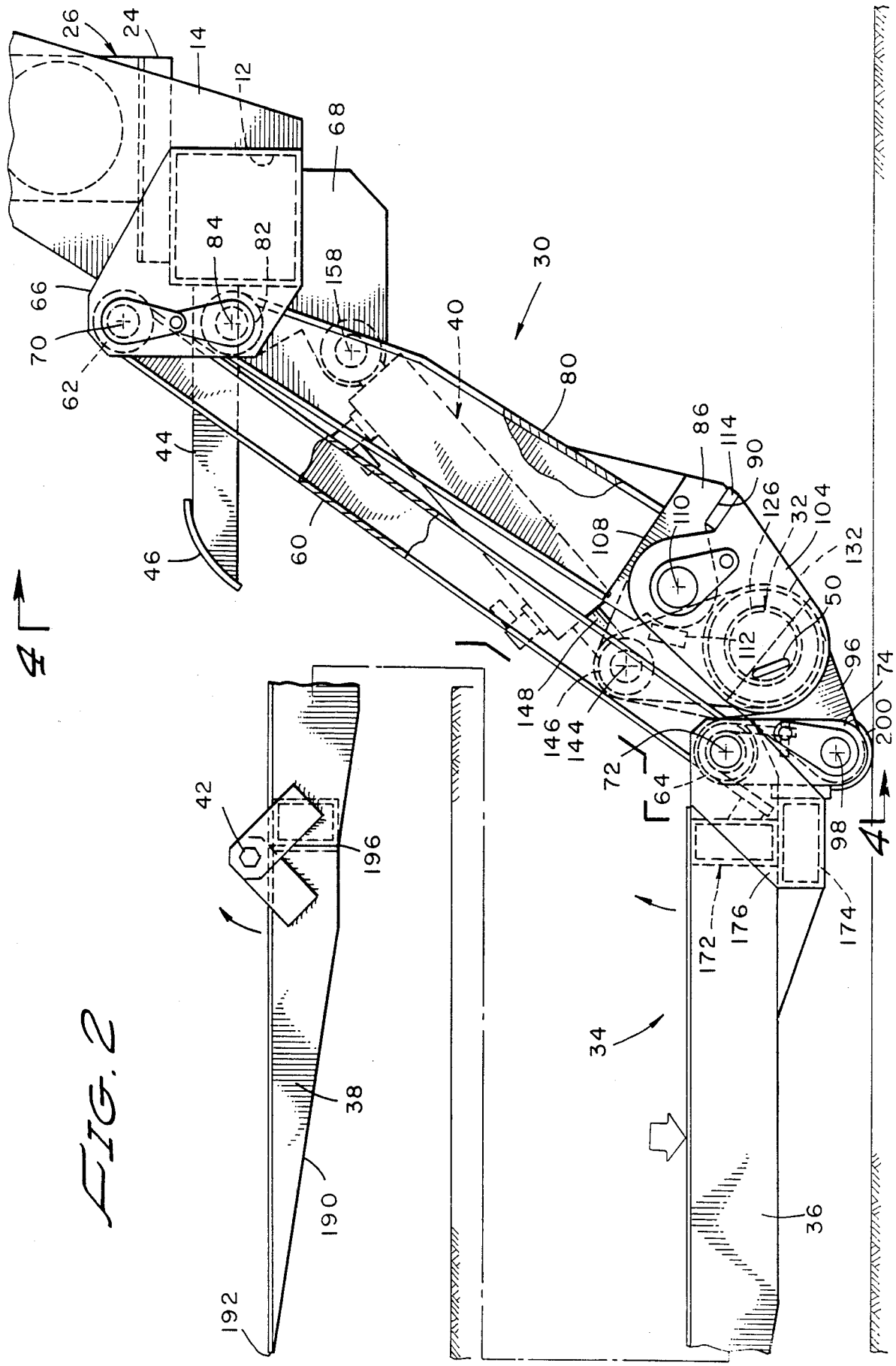
FIG. 2 is a side elevational view of the device shown in FIG. 1 but depicting the relationship of the parts when the platform is in a horizontal attitude at ground level.

The parallelogram linkage system 30 includes an upper link arm 60 fitted at its opposite ends with a forward bearing 62 and a rear end bearing 64. Preferably, as indicated in FIG. 2, the arm 60 takes the form of a hollow box section beam, although a solid bar can be used. In order to pivotally support the arm 60 on the main frame 12, the frame is fitted adjacent one end with a parallel pair of plates 66 and 68 which project rearwardly and upwardly to mount a pin 70 on which the bearing 62 turns. The other or rear end bearing 64 of the upper arm is rotatably seated on a pin 72 that is seated between the upper ends of an identical pair of plates 74 comprising the rear shackle of the linkage. As is indicated in FIGS. 5 and 7, the congruent pair of plates 74 are formed with arcuate ends and are rigidly interconnected in parallel spaced relationship by a rear plate 76 to which they are welded.

Figure 3:
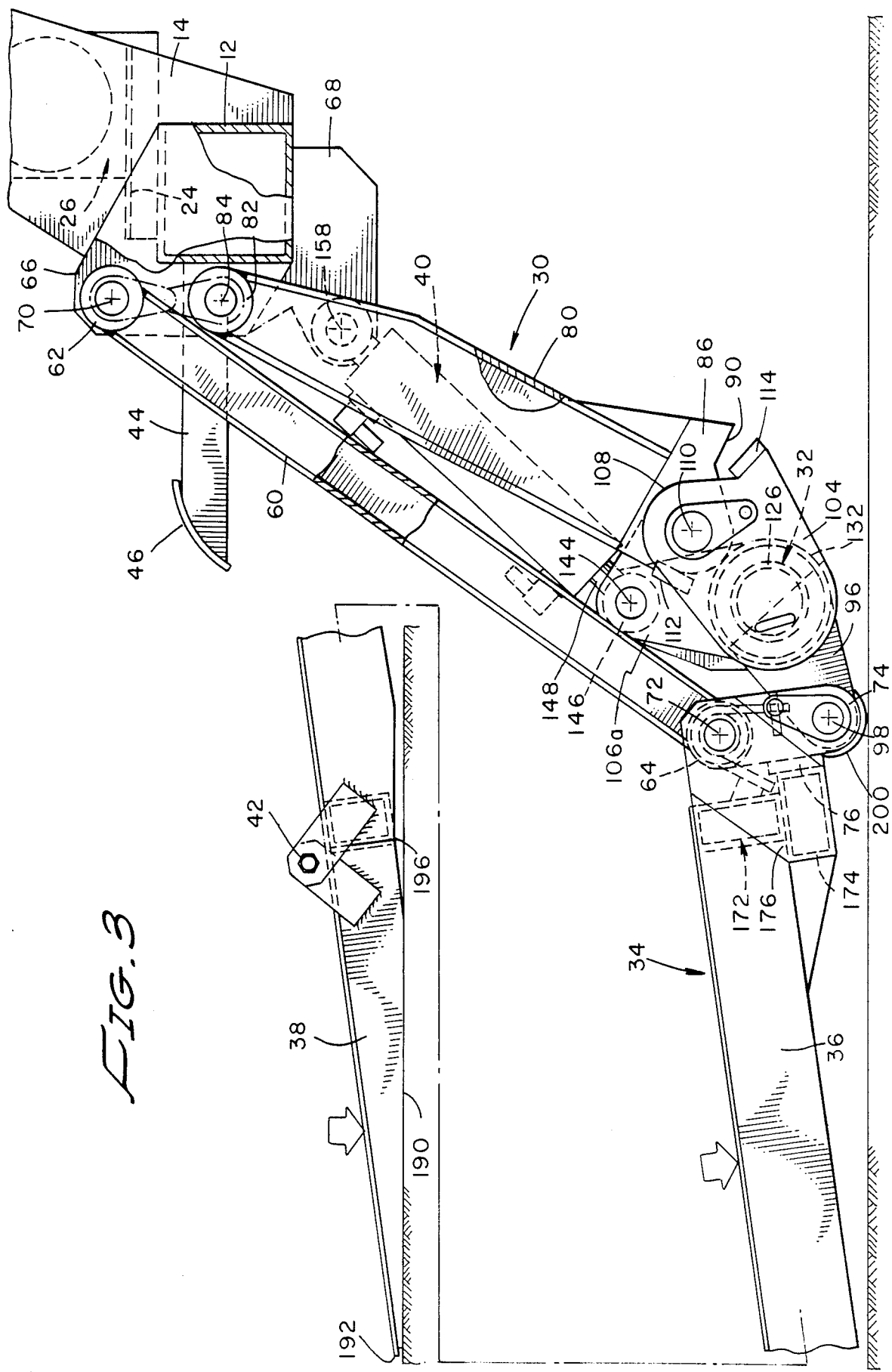
FIG. 3 is a side elevational view similar to FIG. 2 but showing the parts in different relative positions assumed by the parts when the platform is tilted into a ramped condition.

As will appear from examination of FIGS. 2 and 3, the lower link arm of the linkage system 30 comprises a pivotally interconnected pair of sub-assemblies. The forwardmost assembly comprises a hollow box beam 80 which convergently tapers at its forward end to rigidly mount a bearing 82 rotatably mounted on a pin 84 that is mounted on the plates 66, 68 on the main frame 12. The rear end of the hollow member 80 has an irregularly shaped plate 86 affixed thereto whose profile is best seen in FIG. 7. More particularly, the plate 86 has a generally semi-cylindrical lobe 88 on its rear face between an upper shoulder 90 and a lower shoulder 92.

The other of rear section of the lower link arm includes a plate 96 that is pivotally mounted between the shackle plates 74 by means of a pin 98 mounted in the lower ends of the shackle. As is shown in FIG. 7, the plate 96 is generally triangular in profile having opposite edges that diverge forwardly outwardly beyond the forward edges of the shackle plates 74.

The forward edge of the plate 96 is fixed, as by welds 102 (FIG. 6), between a plate 104, whose profile is best seen in FIG. 3, and a plate 106 whose profile is best seen in FIG. 7. Each of these latter plates has a generally forwardly projecting lobe 108, in registration with one another, for mounting a pin 110 which intersects the lobe 88 of plate 86 of the forward link section to pivotally interconnect the two link sections. On substantially diametrically opposite sides of the pin 110, the pair of plates 104, 106 are rigidly interconnected by a pair of blocks 112 and 114 which are welded in place. The block 112 is so oriented that its forward face 116 is disposed in a plane approximately tangent to the lobe 88 of the plate 86 and to position an edge 118 in confronting relationship with the shoulder 92 of the plate 86. The opposite block 114 is welded to forwardly facing edges of the plates 104, 106 on a pair of shoulders 120 and is so positioned as to come into abutment with the shoulder 90 of the casting 86.

The rear section of the lower arm of the linkage system, comprising the parts 96, 104, and 106, is rigidly integrated into an end of the lift frame 32 and drivably interconnected to one of the hydraulic cylinders 40. More particularly, the lift frame 32 comprises a length of tubing 126 of sufficient length to extend between the rearmost portions of the lower link arms. As is shown in FIG. 6, each end of tube 126 has a plate 128 secured thereto, as by means of welding 130. A co-axial tubular spacer 132 is fixed between the outboard side of the plate 128 and the inboard side of the plate 106, as by welding 134. The lift frame 32 is thus rigidly integrated with the rearmost portions of the lower link arms.

The plates 128 and 106 project radially above the lift frame 32 to define crank arm portions 128a and 106a. Just inboard of the plate 128 another plate 140 projects radially upwardly from the tube 126 to which it is welded at 142. A pin 144 is mounted in the outer ends of the plates 142, 128, and 106, and in the space between the latter two plates pivotally mounts a bearing 146 that is integrally joined to the piston rod 148 of hydraulic cylinder 40. A washer 150 and roller 152 are coaxially seated on the pin 144 in the space between the plates 140 and 128 to support the plaform 34 when it is inverted.

In order to pivotally support the forward end of hydraulic cylinder 40 at the main frame 12, a plate 156 is welded to the main frame in parallel spaced relation to and immediately inboard of the plate 68, projecting downwardly in confronting relationship to a corresponding portion of the plate 68. The pair of plates 156, 68 support a pin 158 to pivotally support a bearing 160 integrally joined to the butt end of hydraulic cylinder 40.

The cylinder 40 includes T piston 164 drivingly connected to the piston rod 148 and hydraulic hoses and fittings 166 and 168 interconnected to opposite ends of the cylinder housing. The arrangement is such that when hydraulic pressure is applied through the fitting and hose 168 at the forward end of the cylinder 40, all of the area of the rollers or clear forward face of piston 164 is utilized to effect extension of the piston rod 148 out of the cylinder housing to raise the platform 34. When it is desired to lower the platform, a valve may be opened whereby to bleed fluid out of the cylinder through the forward end fitting and hose 168. Alternatively, a valve may be actuated to deliver hydraulic fluid under pressure from the power source 26 into the hydraulic hose and fitting 168 at the rear end of the cylinder 40 to be impressed on the rear side of the piston 164 in the annular area not occupied by piston rod 148. As electrohydraulic systems and the controls therefor are well known in the art, further description is unnecessary.

Figure 4:
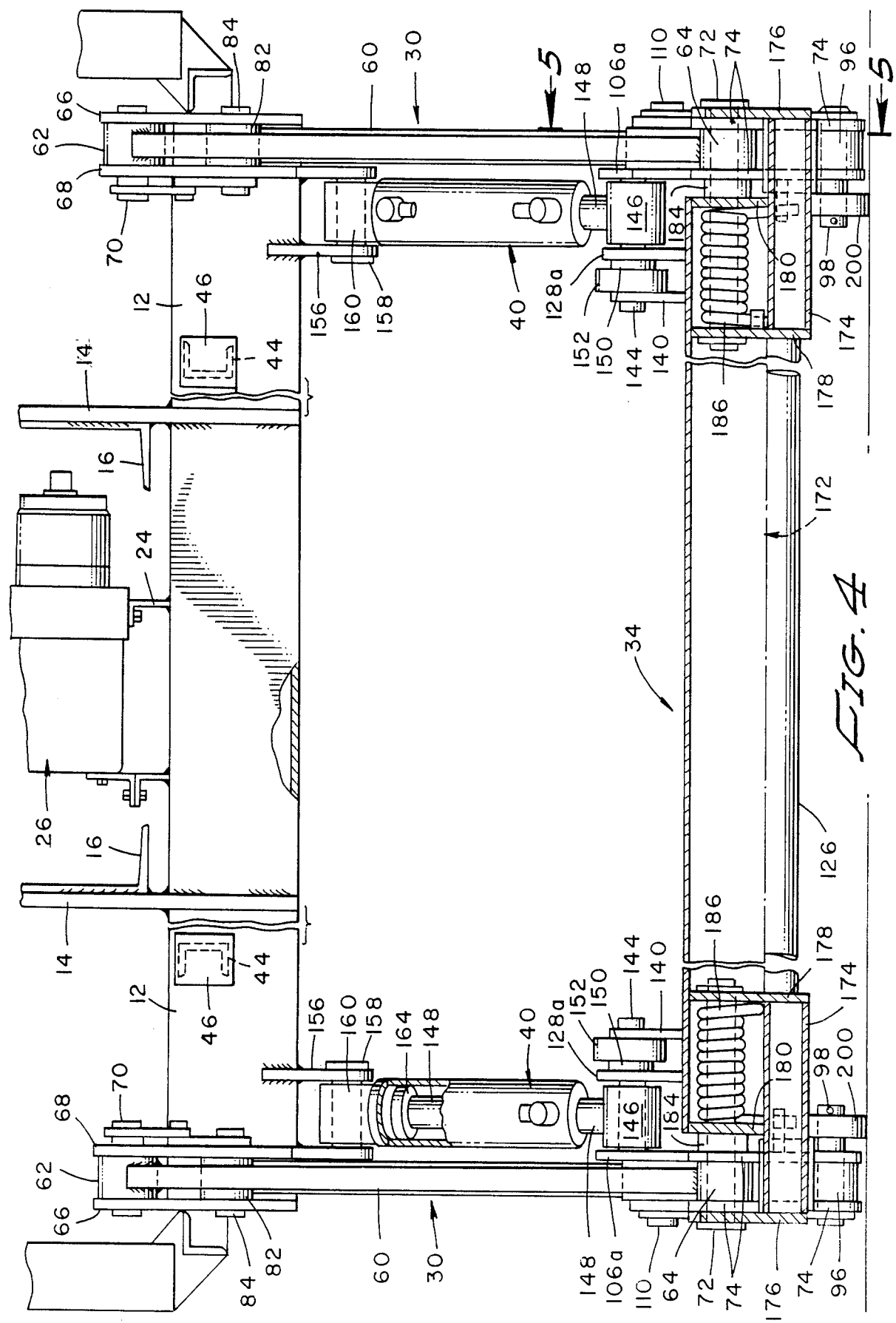
FIG. 4 is a transverse sectional view on the line 4—4 of FIG. 2.

The platform sections 36 and 38 are of conventional construction comprising a skin that is supported on a framework of appropriate structural members such is box beams or channels and the like. However, for purposes of the present invention the main platform section 36 is adapted at each of its opposite sides and along its forward edge portion to be pivotally mounted on the pair of pins 72 of the linkage systems 30, i.e., the upper pin of each of the rear shackle plates 74. More particularly, referring to FIG. 2, a box beam 172 extends along the full width of the main platform 36. Referring to FIG. 4, a piece of box section tubing 174 is rigidly affixed, as by welding, to the underside of the beam 172 to extend outboard of the platform and has a plate 176 rigidly affixed thereto as by welding. Another plate 178 has a lower end rigidly affixed, as by welding, to the inner or inboard end of the piece 174 and, like the plate 176, extends upwardly and forwardly beyond the forward edge of the skin of the platform 36. A third plate 180 is defined in parallel spaced relationship to the plates 176 and 178 by an integral, forwardly projecting extension of a side wall of the main platform section 36.

As is shown in FIG. 4, the forwardly projecting ends of the plates 176, 178 and 180 are formed with coaxial holes in order to receive the pin 72 of the upper end of the shackle plate 74. The spacing between the plates 180 and 176 is such as to receive the shackle therebetween and the shackle is held against lateral displacement by means of an appropriate washer 184 coaxially mounted on the pin 72. In the space between the plates 180 and 178 the pin 72 coaxially mounts a torsion spring 186 adapted to counterbalance the weight of at least the main platform 36.

To accommodate the ramping action of the platform 34, the flip-over platform section 38 is tapered on its underside, as indicated at 190, to lie substantially in flush engagement with the ground surface when the platform as a whole is in the ramped condition. A rearmost edge 192 of the upper skin of the flip-over section 38 is thus disposed in contact with or in close proximity with the ground surface, so that relatively small diameter wheels of a wheeled load can be readily pushed onto the inclined platform.

When the platform 34 has been unfolded out of the transit position into the horizontally rearwardly extending condition of FIG. 1, the extension section 38 is maintained with its skin in coplanar relationship to the skin or the main platform section 36 by virtue of a butt joint abutment 196 of structural portions of the two platforms beneath the hinge 42. At the same time, in both the horizontal and ramped conditions of the platform, the main platform section 36 is at all times maintained against further counterclockwise rotation about the axes of the pins 72 by the engagement of a forward face of the pair of members 174 with the rear face of the plates 76 of the pairs of shackle plates 74. During operation of the lift gate, to shift the platform between the horizontal and ramped conditions, the pair of rear shackles move between the vertical attitude of FIG. 2 and the inclined attitude of FIG. 3. Since this movement takes place when the shackles are at ground level, it is preferable that the lower ends of the shackle plates 74 be protected against wear such as would occur after many cycles of operation.

Accordingly, as seen in FIG. 5, the lower pin 98 of each pair of shackle plates extends inboard beyond the inner plate 74 to coaxially support a ground engaging wheel 200, of a slightly larger radius than the semicircular and of the shackle plates. With this arrangement, a clearance in maintained between the ground and the lower ends of the shackle plates during operation of the lift gate to shift the platform between horizontal and ramped conditions.

The operation of the apparatus is as follows:

The length of the upper link 60 between the axes of pins 70 and 72 is the same as the effective length of the two section lower link arm measured on a straight line between the axes of the pins 84 and 98 when the lift is in the condition of FIG. 2. Assuming that a level ride is desired for the platform, the distance between the pins 72 and 98 of the rear shackle plates 74 is essentially the same as the distance between the pins 70 and 84 at the forward end of the linkage.

The lower link arm of system 30 operates somewhat in the manner of a toggle joint. The knuckle pin 110 pivotally interconnecting the forward link section and the rear link section is offset to one side of a straight ling interconnecting the pins 84 and 98, constituting the opposite ends of the lower link arm, and on the opposite side of the line from the pin 144 pivotally interconnecting piston rod 148 to the rear link section. At the same time, the forward end of the hydraulic cylinder 40 is pivotally interconnected to pin 158 located vertically beneath the forward shackle pins 70 and 84, such that the axis of the cylinder rod extends approximately diagonally with respect to the parallelogram linkage system.

Several important advantages are achieved by the geometry of the linkage system 30 in conjunction with the orientation of the hydraulic cylinder 40.

First, at all times when the weight of the platform 34 is borne solely by the pair of linkage systems 30, i.e., between the bed height of the vehicle and ground level but not ground contact of the rollers 200, the two sections of the lower link arm are securely and positively locked in compression without any danger of opening the knuckle joint. In this phase, the gravitational load on the lower shackle pin 98 generates a counterclockwise moment about the pin 110 of the rigid subassembly 96, 104, 106, as does the hydraulic pressure on the rodless side of piston 164 as exerted on the pin 144 Consequently, the shackle plates 74 and the two sections of the lower link arm are prevented from articulating from the closed condition of FIG. 2 to the open condition of FIG. 3. At the same time, another important advantage is realized during this phase is that the load is absorbed not only by the two section lower link arm but, also, by the hydraulic cylinder 40 along its axis offset from the axis of the lower link arm. As the compressive load is divided between the cylinder and the lower link arm, the latter need not be made of solid members but may be made up of follow members as depicted in the drawings. Further, as the vertically spaced pin connections 84, 158 of the lower link arm and cylinder to the front shackle plates 66, 68, 156, each bears a part of the compressive load the shackle plates need not be as massive as the case in which the entire load is borne by a single pin for a lower link arm that is the sole compression member. The invention thus achieves a drastic reduction in the weight of the liftgate and a corresponding increase in the payload of the vehicle. Finally, as the entire area of the rodless side of the piston 164 is subjected to hydraulic pressure when the apparatus is in the lifting mode, a liftgate of a given load rating may be made with a smaller diameter cylinder than the case in which the rod side of a piston is pressurized to retract the piston rod in the lifting mode.

The linkage system/power cylinder combination of this invention also provides the advantage of automatically shifting the platform between the level and ramped conditions when the platform is at ground level. Referring to FIG. 2, the rollers 200 are in contact with the ground which thus assumes the gravitational load. Assuming that the rodless face of piston 164 is not pressurized, as when the apparatus is in the platform lowering mode, the gravitational load is no longer impressed on cylinder pin 144. As a consequence, there is no moment on the pin 144 relative to the pin 110 in a direction to oppose opening of the knuckle joint. At the same time, a gravitational moment of the platform relative to the upper shackle pin 72 generates a moment on the lower shackle pin 98 in a direction relative to the knuckle pin 110 to open the knuckle joint. The parts of the lower link arm and the rear shackle then articulate from the FIG. 2 to the FIG. 3 position. Abutment of the face 118 of plate 112 of the rear link section with the shoulder 92 of the forward link section arrests the parts in the desired position so that the now inclined platform 34 has its tapered lower face 190 in flush contact with the ground. As is apparent, the platform is returned to level position by pressurizing the rodless face of the piston to close the knuckle joint by bringing the plate 120 of the rear link section and should 90 of the forward link section into tightly compressed abutment.

While the invention has been explained in detail, it is to be understood that the invention is not limited in its application to the details of construction and the arrangements of the components set forth in the description or illustrated in the drawings. The invention is capable of other embodiments and of being practiced and carried out in various ways. Also it is to be understood that the phraseology and terminology employed herein is for the purposes of description and should not be regarded as limiting.

I claim:

1. A lift comprising:
   a support means;
   a linkage system pivotally supported at a first end by said support means whereby a second end of said linkage system is vertically moveable;
   said linkage system comprising an upper link, a lower link means and a shackle means at said second end that is pivotally connected to said upper link and to said lower link means;
   a platform;
   means interconnecting said platform to said upper link at said second end of said linkage system in a manner to extend away from said linkage system while said platform gravitationally biases a lower end of said shackle means in a direction towards said linkage system to exert a compressive force on said lower link means;
   said lower link means comprising a pair of members, a stop means and a pin, said pair of members being jointed together by said stop means and said pin such that when said pair of members of said lower link means is held under compression by said stop means said pair of members are misaligned and said pin is offset to one side of a straight line between the opposite ends of said pair of members of said lower link means; and
   a power means interconnected between said support means and said lower link means to effect vertical movement of said linkage system and said platform,
   said power means having a point of connection to said lower link means on the opposite side of said straight line from said pin.

2. A lift as in claim 1 in which:
   said point of connection of said power means to said lower link means is on that one of said pair of members that is adjacent to said shackle means.

3. A lift as in claim 1 in which:
   said point of connection of said power means to said lower link means is within the area bounded by said linkage system and said pin is offset beneath said straight line between the opposite ends of said pair of members of said lower link means.

4. A lift as in claim 1 in which:

said pin, said point of connection of said power means to said lower link means, and the point of pivotal connection of said shackle means to said lower link means are so located relative to one another that said point of connection of said power means to said lower link means and said point of pivotal connection of said shackle means to said lower link means generated additive moments with respect to said pin in substantially all elevations of said second end of said linkage system other than contact of said shackle means with ground, said additive moments being in a direction tending to align said misaligned pair of members.

5. A lift as in claim 4 in which:
said pin, aid point of connection of said power means to said lower link means, and said point of pivotal connection of said shackle means to said lower link means are so located that upon contact of said shackle means with ground, whereby said platform is primarily supported by ground, the resultant of said moments is in a direction ending to further misalign said pair of members.

6. A lift as in claim 1 in which:
said power means acts on said point of connection to said lower link means along an axis of reciprocation that crosses said straight line between the opposite ends of said lower link means.

7. A lift as in claim 6 in which:
said point of connection of said power means to said lower link means is within the area bounded by said linkage system and said pin is offset beneath said straight line between the opposite ends of said pair of members of said lower link means.

8. A lift as in claim 7 in which:
said power means comprises a piston-cylinder mechanism.

9. A lift comprising:
a support means;
an upper link pivotally supported at a forward end by said support means whereby a rear end of said upper link is vertically moveable;
a platform having a forward edge pivotally connected to said rear end of said upper link, said platform having a planar upper surface and having a rear edge that can be brought into contact with a ground surface when said platform is inclined and supported by said upper link in a lowered position relative to said support means;
a shackle having an upper end pivotally connected to said rear end of said upper link and having a lower end projecting downwardly beyond said forward edge of said platform whereby to engage a ground surface in said lowered and inclined position of said platform;
a lower link means pivotally interconnected at opposite ends between said support means and said lower end of said shackle, said lower link means comprising a pair of forward and rear members jointed together by a pin;
and a power means, extending between said support means and said rear one of said pair of members of said lower link means, to effect vertical movement of said platform,
said lower link means and said power means operating to maintain a substantially horizontal attitude of said upper surface of said upper platform in substantially all elevations of said platform other than contact of said shackle with a ground surface and to incline said upper surface in reaction to said lower end of said shackle coming into contact with a ground surface and said platform thereupon being primarily supported by ground.

10. A lift as in claim 9 in which:
said pair of members are jointed together in misalignment by said pin at a position that is offset to one side of a straight line between the opposite ends of said pair of members of said lower link means; and
said power means has a point of connection to said rear member of said lower link means on the opposite side of said straight line from said pin.

11. A lift as in claim 10 in which:
said power means acts on said point of connection to said lower link means along an axis of reciprocation that crosses said straight line between the opposite ends of said pair of members of said lower link means.

12. A lift as in claim 11 in which:
said point of connection of said power means to said rear one of said members of said lower link means is within the area bounded by said upper link and said lower link means and said pin is offset beneath said straight line.

13. A lift as in claim 12 in which:
said power means comprises a piston-cylinder mechanism; and
said piston-cylinder mechanism comprises a piston rod that is moveable by said piston to a position of maximum extension out of said cylinder when said platform is raised.

14. A lift having a ramping platform, said lift comprising:
a support means;
a spaced pair of linkage systems, each having a forward end pivotally connected to said support means whereby a rear end thereof is vertically moveable;
a platform connected to said rear end of said linkage systems;
each of said linkage systems comprising an upper link, a lower link means and a shackle means that is pivotally connected to said upper link and to said lower link means at said rear end of said linkage system,
said lower link means comprising a pair of forward and rear section that are pivotally interconnected by a pin;
stop means in said lower link means to limit relative pivotal movement of said pair of sections in one direction of rotation tending to align said pair of sections;
means extending between said support means and said rear one of said section of said lower link means for selectively biasing said pair of sections in said one direction of rotation; and
ramping means comprising said platform, said shackle means and said rear one of said pair of sections for normally biasing said pair of sections in said one direction during activation of said means extending between said support means and said rear section,
said ramping means operating to bias said pair of sections in an opposite direction tending to misalign said pair of sections when said platform is at ground level and said means extending between said support means and said rear section is deactivated, whereby to effect ramping of said platform.

15. A lift as in claims 14 in which:
said pair of sections are misaligned such that said pin is offset to one side of a straight line between opposite ends of said pair of sections of said lower link means.

16. A lift as in claim 15 in which:
said means extending between said support means and said rear section of said lower link means is connected at a point on said rear section located on the opposite side of said straight line from said pin.

17. A lift as in claim 15 in which:
said means extending between said support means and said rear section of said lower link means comprises a power means to effect vertical movement of said platform.

18. A lift as in claim 15 in which:
said means extending between said support means and said rear section of said lower link means is disposed along an axis that crosses a straight line between opposite ends of said pair of sections of said lower link means.

19. A lift comprising:
a main frame;
a laterally spaced apart pair of parallelogram linkage systems having forward ends pivotally connected to said main frame,
each of said linkage systems comprising an upper link, a lower link and a shackle pivotally interconnected to rear ends of said upper link and lower link,
each of said lower links comprising a forward section and a rear section that are pivotally interconnected by a pin;
stop means in each of said lower links for bidirectionally limiting relative regular movement of said forward and rear sections;
a lift frame extending between and rigidly interconnected to said rear sections of said lower links;
a substantially rectangular platform pivotally mounted along a forward edge to said pair of upper links and to said shackles,
said platform being pivotally moveable between a generally horizontally disposed position extending rearwardly from said shackles and an inverted position in which said platform extends forwardly from said shackles; and
a laterally spaced apart pair of selectively operable means operatively interconnected between said main frame and said lift frame to oppose relative angular displacement of said forward and rear sections in a direction relative to said pin tending to misalign said forward and rear sections.

20. A lift as in claim 19 in which:
said last mentioned means comprises a powered piston-cylinder mechanism having an axis of reciprocation that crosses said lower link.

21. A lift as in claim 20 in which:
forward ends of said upper link, said lower link and said piston-cylinder mechanism are pivotally connected to vertically spaced apart points of said main frame, and
said piston-cylinder mechanism comprises a piston rod that is moveable to a position of maximum extension out of said cylinder whenever said platform is raised,
whereby a compressive force exerted by said platform on said lower link is distributed between said lower link and said piston-cylinder mechanism.

22. A lift as in claim 21 in which:
said forward section of each of said lower links comprises a hollow member.

23. A lift as in claim 19 in which:
said lift frame and said rear sections of said lower links comprise a unitary assembly.

24. A lift as in claim 19 in which:
each of said shackles mounts a ground engageable roller at its lower end to maintain said shackles out of contact with ground when said platform is in a lowered position.

25. A lift comprising:
a support means;
a linkage system pivotally supported at a forward end by said support means whereby a rear end of said linkage system is vertically movable;
said linkage system comprising an upper link, lower link means and a shackle means at said rear end that is pivotally connected to said upper link and to said lower link means;
a platform;
means interconnecting said platform to said upper link at said rear end of said linkage system in a manner to extend away from said linkage system while said platform gravitationally biases a lower end of said shackle means in a direction towards said linkage system to exert a compressive force on said lower link means;
said lower link means comprising a pair of forward and rear members, a stop means and a pin, said pair of members being jointed together by said stop means and said pin such that when said pair of members of said lower link means is held under compression by said stop means, said pair of members are misaligned and said pin is offset beneath a straight line between the opposite ends of said pair of members of said lower link means; and
a power means comprising a piston-cylinder mechanism extending between said support means and said rear one of said pair of members of said lower link means to effect vertical movement of said linkage system and said platform,
said power means having a point of connection to said rear member of said lower link means on the opposite side of said straight line from said pin, aid power means having an axis of reciprocation that crosses said straight line between the opposite ends of said lower link means,
said point of connection of said power means to said lower link means being within the area bounded by said linkage system,
said piston-cylinder mechanism comprising a piston rod that is extended by said piston out of said cylinder whenever said platform is raised,
whereby compressive force exerted by said platform on said lower link means is distributed between said lower link means and said piston-cylinder mechanism.

* * * * *